United States Patent [19]
Khadim

[11] Patent Number: 5,762,087
[45] Date of Patent: Jun. 9, 1998

[54] INSTANT-ON VALVE CONSTRUCTION FOR HIGH PRESSURE GAS

[75] Inventor: Neil Khadim, Ontario, Canada

[73] Assignee: GFI Control Systems, Inc., Ontario, Canada

[21] Appl. No.: 679,870

[22] Filed: Jul. 15, 1996

Related U.S. Application Data

[60] Provisional application No. 60/001,160 Jul. 14, 1995.
[51] Int. Cl.⁶ ................................................. F16K 31/12
[52] U.S. Cl. .................. 137/1; 251/30.02; 251/30.04; 251/38
[58] Field of Search ................... 251/30.01, 30.02, 251/30.03, 30.04, 33, 38; 137/1

[56] References Cited

U.S. PATENT DOCUMENTS

| | | | |
|---|---|---|---|
| 3,405,906 | 10/1968 | Keller | 251/30.04 |
| 4,304,264 | 12/1981 | McClintock et al. | 251/30.04 X |
| 4,526,340 | 7/1985 | Kolchinsky et al. | 251/38 |
| 4,679,765 | 7/1987 | Kramer et al. | 251/38 |
| 4,699,351 | 10/1987 | Wells | 251/38 X |
| 5,301,920 | 4/1994 | Ichiki | 251/30.04 |

*Primary Examiner*—Kevin Lee
*Attorney, Agent, or Firm*—Shoemaker and Mattare Ltd.

[57] ABSTRACT

A valve construction for high pressure gases, allowing rapid opening and closing, includes a main body with inlet and outlet passages, and a guide sleeve having a primary and a secondary piston slidably mounted within the sleeve, the primary piston being adjacent a closure at one end of the sleeve, and the secondary piston being at the end of the primary piston which is remote from the closure. The secondary piston supports a seal for closing the gas outlet passage when the secondary piston is remote from the closure. The secondary piston has an axial passage with an elongate member movable therein, the elongate member being fixed to the primary piston. A valve means is provided between the axial passage and the elongate member, the valve means being open when the bleed orifice is closed. A peripheral seal between the secondary piston and the sleeve acts to restrain the axial movement of gas. An access passage connects the periphery of the secondary piston with a location on the axial passage, while a passageway in the secondary piston connects the region between the first and second pistons with the bleed orifice chamber. An electrical coil acts to generate a magnetic field. The valve construction thus defined is in equilibrium when the coil is de-energized, the seal means closing the gas outlet passage, the closure portion closing the bleed orifice, and the primary piston being furthest remote from the closure. When the coil is energized, the primary piston moves toward the closure until the valve means closes, lifting the closure portion off the bleed orifice and permitting gas to escape from around the primary piston, through said passageway, and out the bleed orifice, thus resulting in an increase in the pressure differential across the peripheral seal.

12 Claims, 4 Drawing Sheets

5,762,087

1

INSTANT-ON VALVE CONSTRUCTION FOR HIGH PRESSURE GAS

BACKGROUND OF THIS INVENTION

In vehicles powered by natural gas or other gaseous fuel, a high-pressure tank is provided for containing the fuel, and a valve is utilized to open and close a passageway along which high-pressure gaseous fuel flows from the tank to the vehicle engine. Usually, such valves are controlled by a solenoid.

A major problem faced by the designer of such valves arises from the high pressure of the gaseous fuel which is controlled by the valve. Tank pressures are typically in the range of 3600 psi, and under adverse temperature conditions can rise to as high as 5000 psi.

Typical diameters for inlet and outlet passageways for the high pressure gas are around ⅓" (and more in the case of larger engines such as those used for buses and large trucks). Since it is important that the valve not constitute an obstruction to the flow of the high pressure gas to the engine, the valve typically includes a valve closure portion adapted to open or close at least the full size of the fuel passageway. When the latter is approximately ⅓", the high pressure gas "behind" the valve closure can require very high forces (300–400 lbs) to be exerted in order to remove the closure and allow the high pressure fuel from the tank of have access to the outlet passageway and ultimately to the engine.

Solenoids of manageable size typically produce a pulling force in the range of 1–3 lbs., which of course is totally inadequate for unseating a valve that is being pressed shut by a force of 300–400 lbs.

As a result, prior valve designs have utilized a two-stage process in which, firstly, a small "bleed" orifice is opened by withdrawing a suitable valve closure, the "bleed" orifice being connected to the downstream gas outlet passageway. The high pressure gas from the tank is allowed to exit through the "bleed" orifice and into the outlet passageway and the line leading to the engine, thus gradually building up pressure in the outlet passageway and line (as these fill with gas), and at the same time gradually lowering the threshold force required to unseat the main valve closure. Eventually the differential pressure between the inlet and outlet of the valve becomes small enough to allow the relatively weak pull of the solenoid to unseat the main valve, thus allowing the high pressure gas from the tank to have full access to the outlet gas passageway.

A major disadvantage of the system just described is the length of time required for the outlet passageway and feed line to fill with high pressure gas, to the point where the solenoid is capable of unseating the main valve. In particularly large vehicles like buses, where the gaseous fuel tank may be 20 or 30 feet away from the engine, a considerable amount of gas must be admitted to the line leading from the valve to the engine, in order to increase the pressure sufficiently for the main valve to be opened. Up to 10 seconds or more may be required in some cases.

In view of the foregoing disadvantage of conventional valves for high pressure gaseous fuel, it is an object of one aspect of this invention to provide a valve construction which provides essentially an "instant-on" characteristic, wherein the complete opening of the major valve is accomplished within a small fraction of a second after the energization of the solenoid coil.

It is an object of another aspect of this invention to provide a valve construction of the general kind described

2 above, but which operates entirely independently of the pressure in the outlet passageway. The construction is such that, even if the outlet passageway were vented directly to the atmosphere, the valve would still function equally well and equally quickly.

GENERAL DESCRIPTION OF THIS INVENTION

Accordingly, this invention provides a valve construction for high pressure gases allowing rapid attainment of a fully open condition, comprising:

a main body defining a gas inlet passage and a gas outlet passage, a guide sleeve having at one end a closure preventing the escape of gas, a primary piston slidably mounted within said sleeve for movement toward and away from the closure, the primary piston having a loose fit within the sleeve, sufficient to allow gas from one end of the piston to reach the other end thereof, a biassing means urging the primary piston away from the closure, a secondary piston slidably mounted within said sleeve adjacent the primary piston at the end thereof remote from the closure, the secondary piston having a loose fit within the sleeve, thus allowing gas to enter the space between the secondary piston and the sleeve, seal means on said secondary piston adapted to close said gas outlet passage when the secondary piston is at a position remote from said closure, an axial passage within said secondary piston, the axial passage including a small-diameter bleed orifice, the axial passage communicating remote from the primary piston with the gas outlet passage, an elongate member received in said axial passage with sufficient tolerance to allow the passage of gas between the elongate member and the secondary piston, the elongate member including a closure portion adapted to close and open said bleed orifice, the elongate member being affixed to said primary piston for axial movement therewith, the closure portion passing through a bleed orifice chamber directly adjacent the bleed orifice, the bleed orifice chamber communicating with said axial passage, valve means between the axial passage and the elongate member which is open when the bleed orifice is closed, and which can be closed by relative movement of the elongate member with respect to the axial passage, a peripheral seal between the secondary piston and the sleeve, acting to restrain the passage of gas axially between the secondary piston and the sleeve, an access passage connecting a) a location on the periphery of the secondary piston which is, with respect to the peripheral seal, remote from the primary piston, and b) a location on the axial passage which is, with respect to said valve means, remote from the primary piston, a passageway in said secondary piston which connects the region between the first and second pistons with said bleed orifice chamber, and electrical coil means around the sleeve for generating a magnetic field adjacent the general location of the primary piston, such that the valve construction is in equilibrium when the coil is de-energized, said seal means closes the gas outlet passage, said closure portion closes the bleed orifice, and said primary piston is furthest remote from said closure; said valve construction departing from equilibrium when the coil is energized, thus moving said primary piston toward the closure until said valve means closes, whereby the closure portion lifts off the bleed orifice and permits gas to escape from around the primary piston through said passageway and out the bleed orifice, thus resulting in an increase in the pressure differential across said peripheral seal, which urges the secondary piston to move toward the primary piston, thus opening said seal means.

Further, this invention provides a method of enabling the rapid, complete opening of a valve for high pressure gases, comprising the steps:

a) within a guide sleeve closed at one end, mounting for sliding movement therealong a ferromagnetic primary piston adjacent the closed end and a ferromagnetic secondary piston remote from the closed end, while ensuring a loose fit such that gas can pass between each piston and the guide sleeve, b) providing in the secondary piston an axial passage which includes a small-diameter bleed orifice and which communicates with the gas outlet passage, c) providing an elongate member within said axial passage for movement therealong, the elongate member having a loose fit to enable gas to pass between the elongate member and the axial passage, the elongate member having a closure portion adapted to close and open the bleed orifice, the closure portion passing through a bleed orifice chamber which is directly adjacent the bleed orifice and which communicates with the axial passage, d) shaping the elongate member and the axial passage so as to define a valve means which is open when the bleed orifice is closed, and which can be closed by relative movement between the elongate member and the axial passage, e) sealing the space between the secondary piston and the guide sleeve so as to permit longitudinal movement but to restrain the movement of gas therebetween, f) by means of an access passage, connecting the periphery of the secondary piston at a location remote from the primary piston with respect to the seal defined under e), to a location on the axial passage which is remote from the primary piston with respect to the valve means defined under d)

g) linking the region between the two pistons with the bleed orifice chamber by way of a passageway;

h) biassing the primary piston away from the closed end, i) whereby equilibrium is attained and the seal means remains closed so long as no magnetic flux seeks to move the secondary piston toward the closed end of the sleeve, but opening of the seal means closing the gas outlet passage is attainable by:

j) moving the primary piston toward the closed end of the guide sleeve by establishing a magnetic field linking only portions of the primary piston, thus k) opening the bleed orifice and closing the said valve means between the axial passage and the elongate member, thus l) increasing the differential pressure on the secondary piston, as seen across the seal defined under e), thus m) moving the secondary piston away from the gas outlet passage, and allowing direct communication between the gas outlet and the gas inlet passages.

GENERAL DESCRIPTION OF THE DRAWINGS

One embodiment of this invention is illustrated in the accompanying drawings, in which like numerals denote like parts throughout the several views, and in which.

DETAILED DESCRIPTION OF THE DRAWINGS

Figure 1:
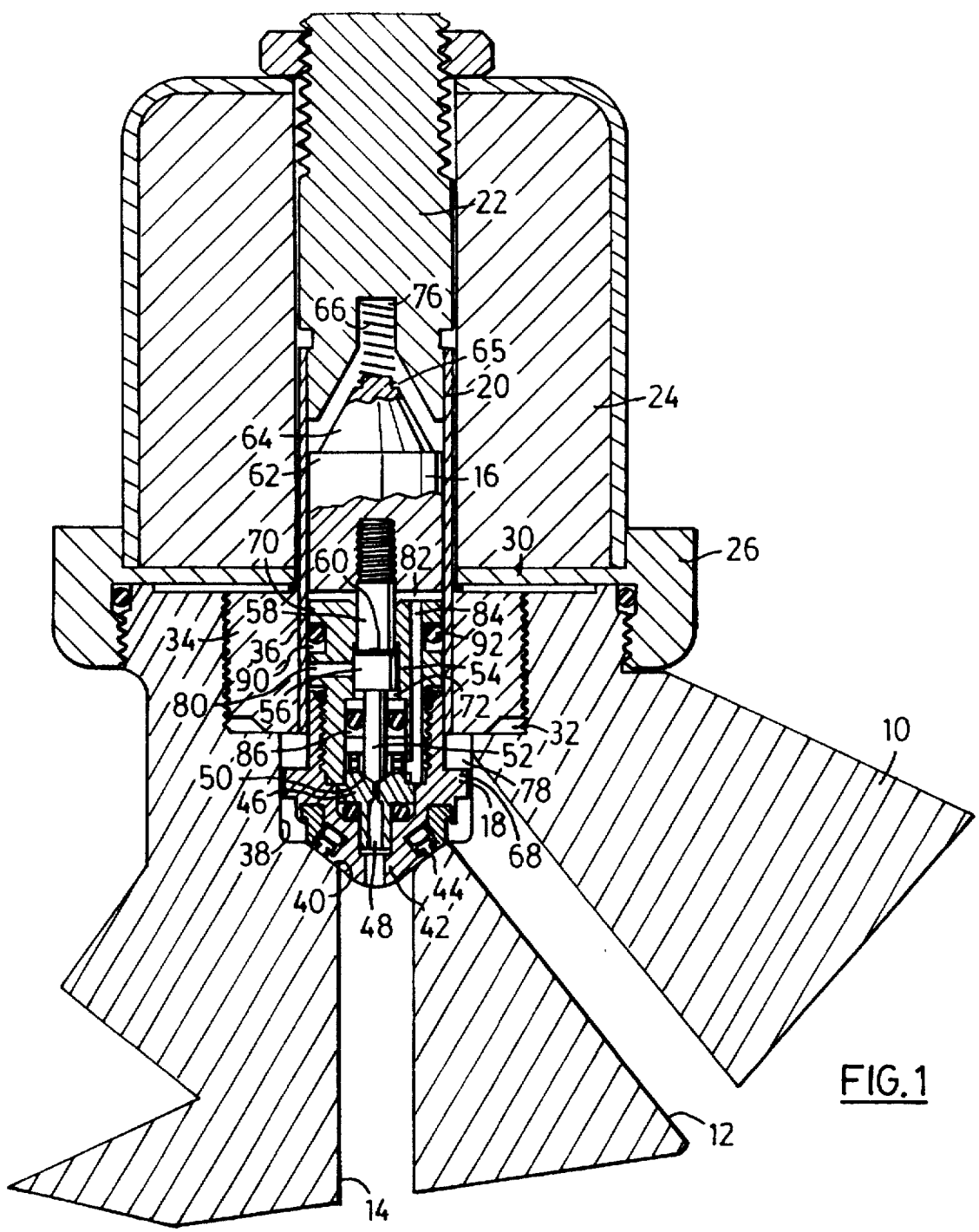
FIG. 1 is an axial sectional view through a valve constructed in accordance with this invention, showing the valve in the "closed" condition.
Figure 2:
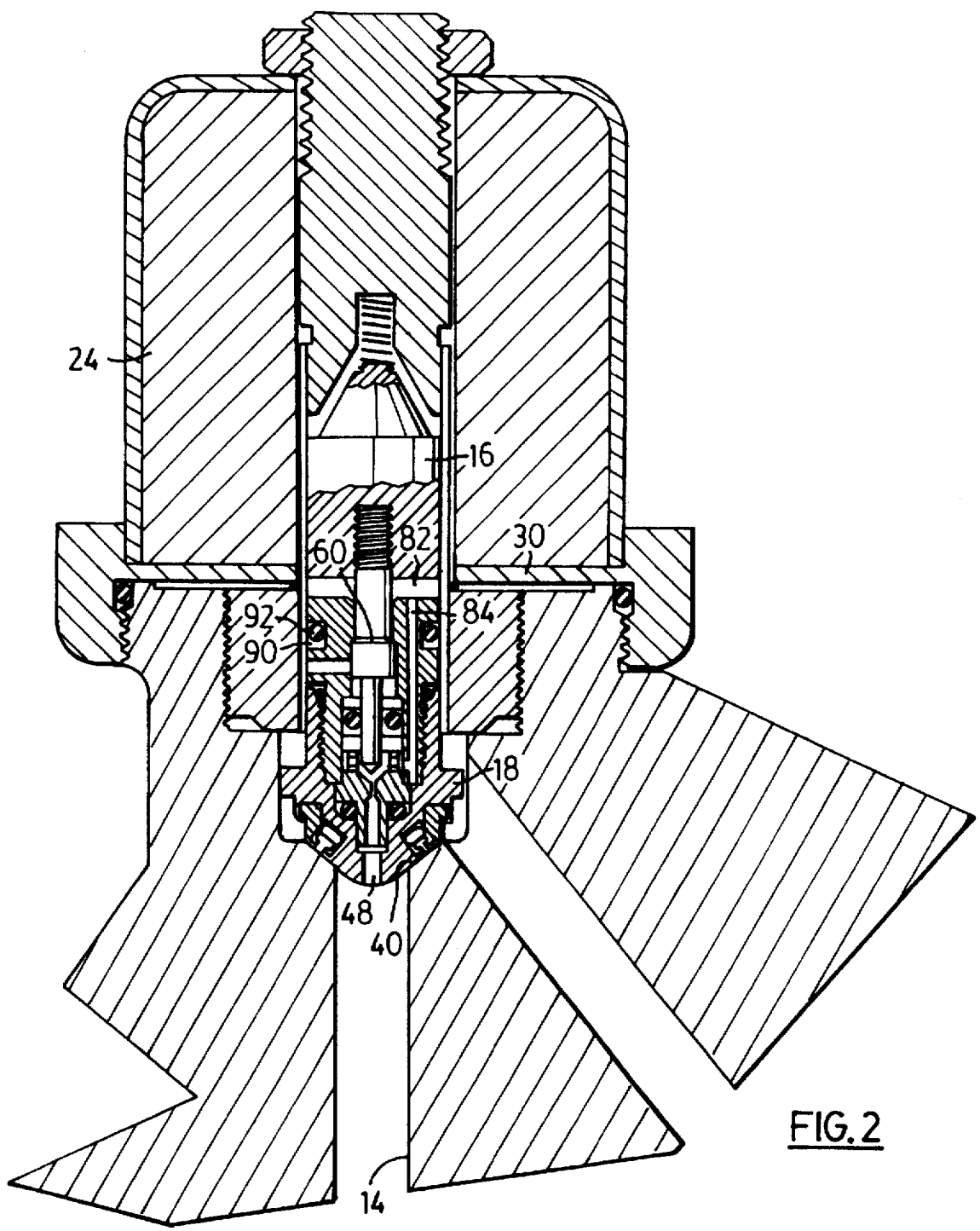
FIG. 2 is a view similar to that of FIG. 1, showing the valve at a first stage following energization of the solenoid.

Attention is first directed to FIG. 1, which shows a main valve body in section at the numeral 10. Drilled into the main body 10 are an inlet passageway 12 and an outlet passageway 14.

The drawing illustrates a primary piston 16 and a secondary piston 18 which are slidably connected to one another in a manner to be described below, and which are slidable within a sleeve 20 secured to a stop block 22, with a solenoid coil 24 of conventional construction being mounted about the combination of the sleeve 20 and the stop block 22. Immediately below the solenoid coil 24, and firmly supporting the same, is a collar 26 having an internal thread which engages a suitable external thread on the main body 10 and which has an integral flange 30 extending inwardly to a location adjacent the sleeve 20. The material of the collar 26 is ferro-magnetic, with the result that the flux lines of the magnetic field created by the solenoid coil 24 pass only through bodies having a portion lying above the horizontal plane of the flange 30. In the condition shown in FIG. 1, the magnetic flux lines engage only the primary piston 16, because the secondary piston lies entirely below the plane of the flange 30.

Located below the bottom of the sleeve 20, and machined out of the main body 10, is a first cylindrical recess 32 having internal threads at its outer wall, engaging the external threads of a ring member 34. The ring member 34 has an internal cylindrical bore 36 which snugly supports the bottom end of the sleeve 20.

Also machined into the main body 10 is a further cylindrical recess 38 which is coaxial with the outlet passageway 14 and defines a frusto-conical valve seat 40, also coaxial with the outlet passageway 14.

The secondary piston 18 has a closure portion 42 which closes the outlet passageway 14 when the secondary piston 18 is in its lowermost position. The secondary piston also supports a ring seal 44 which forms an effective seal against the frusto-conical valve seat 40.

Vertically above the closure portion 42 is an insert 46 having a cylindrical coaxial passageway 48, which necks down at the upper end to form a "bleed" orifice. The "bleed" orifice communicates at the top with a frusto-conical valve seat 50, which may be closed or opened by the conical lower end of a valve stem 52 which is the lower part of an elongate member 54 that includes a first intermediate cylindrical portion 56, surmounted by a second intermediate cylindrical portion 58 of small diameter, the portions 56 and 58 being connected by a frusto-conical valve surface 60. The cylindrical portion 58 is loosely fitted within the axial passage to allow the portion 60 to function as a valve or an opening and closing portion, allowing gas to flow from the passage 80 to the chamber 82. The valve stem 52 is threaded coaxially into the bottom of the primary piston 16, as shown.

The primary piston 16 consists essentially of a lower cylindrical portion 62 which is surmounted by an integral coaxial conical frustum 64. The conical frustum 64 has a cylindrical gallery 65 adjacent its peak, adapted to receive one end of a compression coil spring 66.

Returning now to the secondary piston 18, this can be seen to include an outwardly projecting flange 68 which has a loose tolerance within the cylindrical recess 38, and an upstanding, generally cylindrical upper portion 70, the details of which will now be discussed.

The upper portion 70 has, firstly, a two-stage internal concentric bore 72, including two sections which have respective diameters slightly greater than the respective outside diameters of the portions 56, 58 of the stem 54. When the lower end of the stem closes the valve seat 50, the valve defined by the frusto-conical surface 60 is spaced away from the similar frusto-conical transition between the upper and lower part of the bore 72. Due to the deliberate provision of the loose tolerance between the upper portion 70 and the lower end of the sleeve 20, high pressure gaseous fuel can find its way to the space 76 between the primary piston 16 and the stop block 22. This takes place as follows:

Firstly, the high pressure gas entering along the inlet passageway 12 has direct access to the somewhat annular chamber 78 lying immediately above the outward flange 68. Due to the above-mentioned loose tolerance, the gas passes upwardly in the small space between the upper portion 70 and the sleeve 20, reaching the level of a diametral bore 80, thence passing inwardly along the bore 80 to the slight tolerance surrounding the lower intermediate cylindrical portion 56. Since the valve constituted by the frusto-conical transition 60 and the step in the corresponding bore is open, the high pressure gas from the bore 80 passes upwardly alongside the portions 56 and 58 to an annular space 82 between the primary piston 16 and the secondary piston 18. The gas reaching the space 82 passes upwardly along the outside of the cylindrical portion 62 of the primary piston (which also has a loose tolerance with respect to the sleeve 20), and fills the space 76 up to a pressure substantially equal to that in the tank.

Also, gas from the annular chamber 82 passes downwardly along the eccentric but axially aligned passageway 84 to reach a bleed orifice chamber 86 surrounding the lower end of the rod 52. The chamber 86 contains annular sealing means.

What has just been described is the "static" condition of the valve when the solenoid coil 24 is not energized, and when the vehicle is at rest.

Assume now that the solenoid coil 24 is energized. This will exert an upward pull on the primary piston 16 but no force on the secondary piston 18 (since the latter is wholly below the flux-limiting flange 30). Because, at the moment the solenoid coil is energized, the primary piston 16 has equal pressure above and below, there will be little resistance (aside from that exerted by the small coil spring 66) to the upward movement of the primary piston 16.

As soon as the primary piston 16 starts to move, it opens the small "bleed" orifice at the top of the passageway 48, and high pressure gas immediately starts to pass to the outlet passageway 14. However, this entry of gas into the passageway 14 plays no part in the control of the valve, as will be seen from what follows.

The primary piston continues to move upwardly until the valve constituted by the frusto-conical portion 60 and the matching part of the bore closes, whereupon no further high pressure gas can pass to the annular space 82 defined between the primary piston 16 and the secondary piston 18. As a result, the high pressure gas in the space 76 and all along the outside of the primary piston 16 passes downwardly through the bore 84, and out through the passageway 48.

Attention is now directed to a particular feature of the construction of the secondary piston 18, namely the annular gallery 90 and the O-ring 92 which it contains. Because of the sealing effect of the O-ring 92, the latter defines a differential pressure plane. As the high pressure gas drains downwardly along the bore 84, the downward pressure on the secondary piston 18 quickly drops, and a point will be reached where the force lifting upwardly on the O-ring 92 and the secondary piston 18 (due to the direct access of the high pressure gas to the gallery 90) will exceed the downward force on the secondary piston 18 defined by the area of a circle having the diameter of the ring seal 44, multiplied by the (quickly lowering) pressure in the annular chamber 82. When this state is reached, the secondary piston 18 will move upwardly off the valve seat 40, as seen in FIG. 3, and high pressure gas will flow directly from the inlet passageway 12 to the outlet passageway 14.

Figure 3:
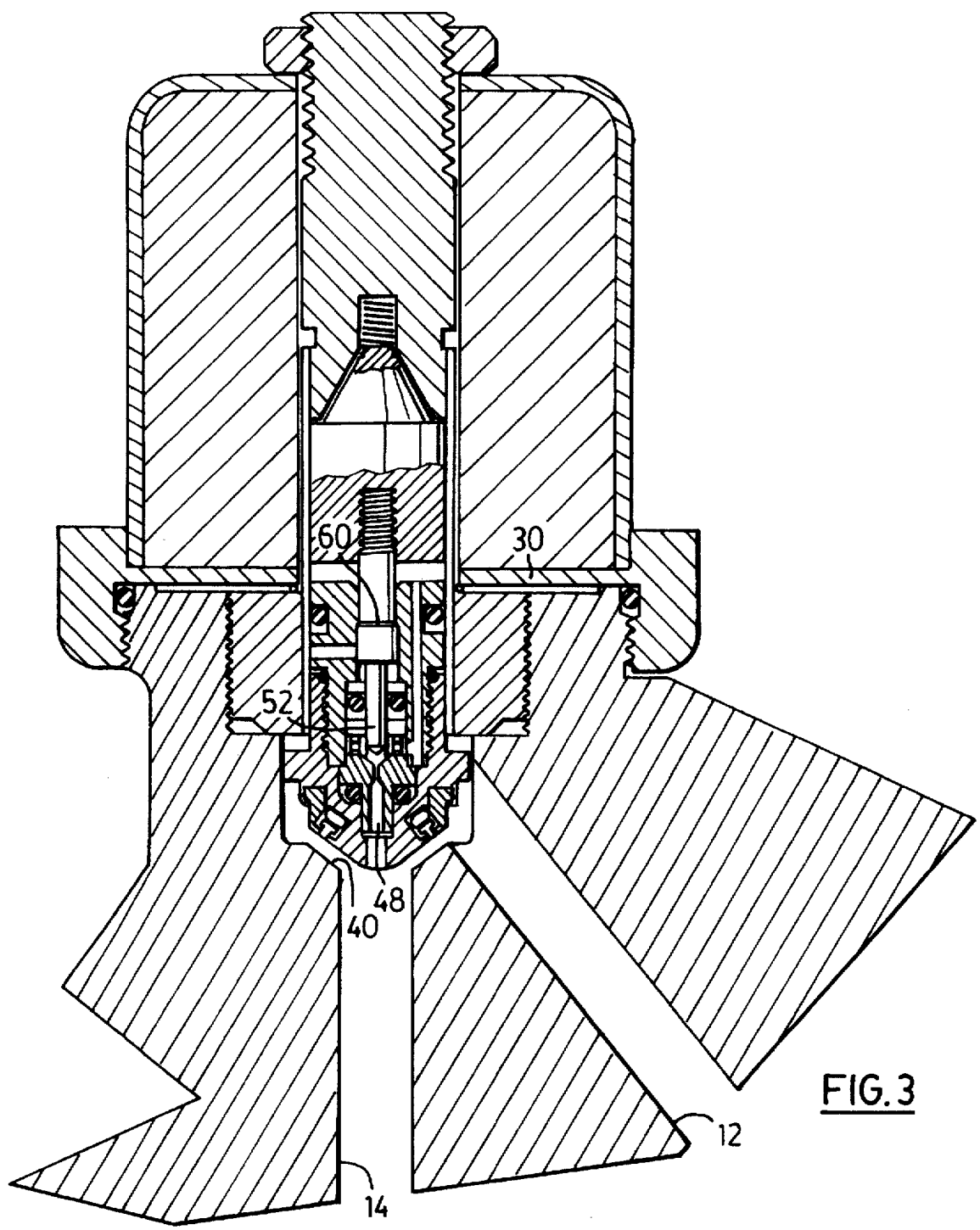
FIG. 3 is a view similar to FIG. 1, showing the valve at a second stage following energization of the solenoid.

It will also be noted in FIG. 3 that the secondary piston 18 has moved so that its upper portion projects slightly into the magnetic flux path which is controlled by the flange 30. This causes attraction between the primary piston 16 and the secondary piston 18, tending further to lift the secondary piston 18 away from the valve seat 40.

Figure 4:
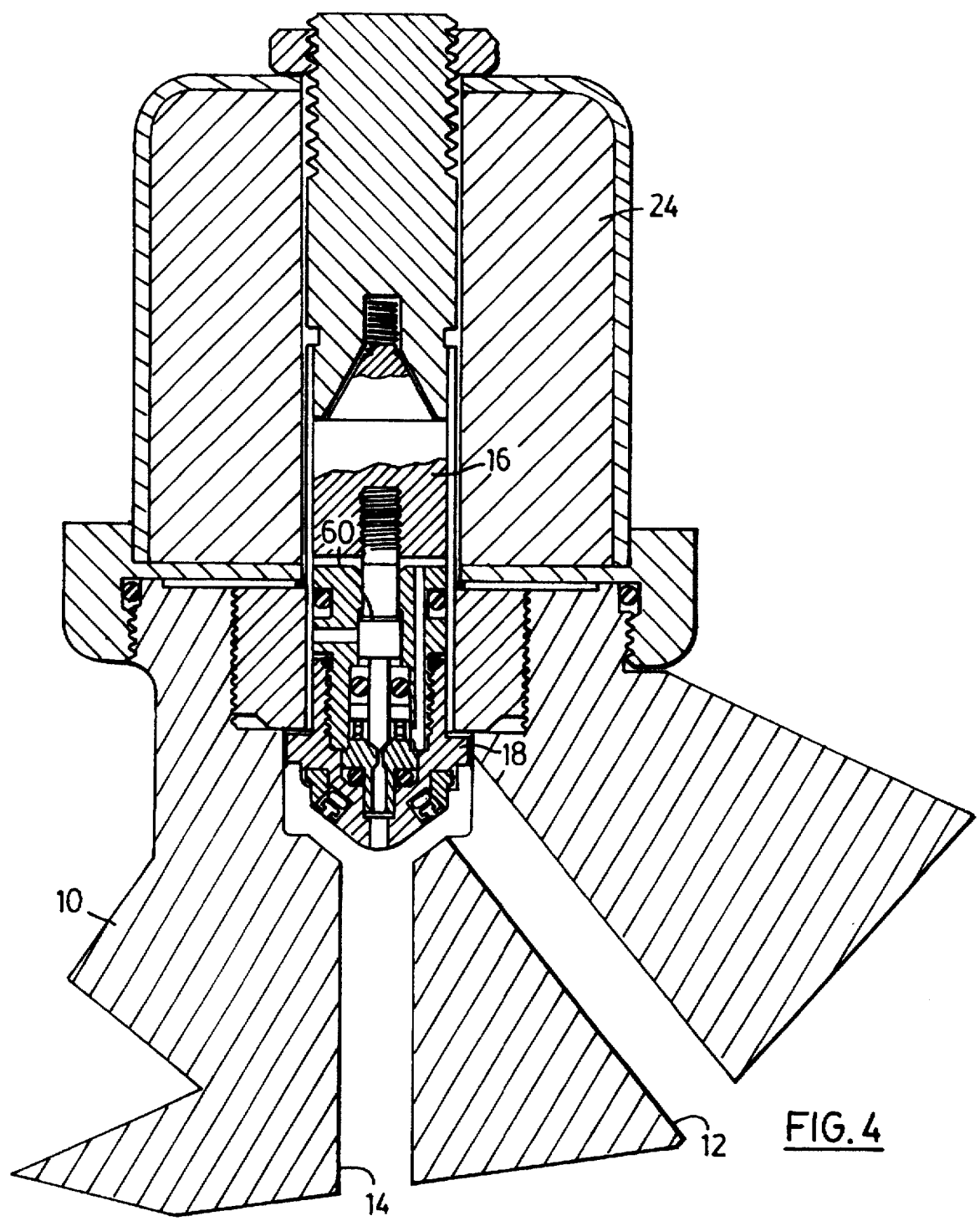
FIG. 4 is a view similar to FIG. 1, showing the valve at a third stage following energization of the solenoid.

Attention is now directed to FIG. 4. Since the valve defined by the frusto-conical surface 60 has now opened due to the further upward movement of the secondary piston 18 (because of the magnetic force), the pressure differential across the O-ring 92 win be reduced, and will gradually progress toward equilibrium. The secondary piston 18 can move upwardly only as far as permitted by the bottom end of the rod 52 coming into contact with the frusto-conical valve seat at the top of the passageway 48, thus closing the flow path represented by the passageway 48.

The result is that the secondary piston 18 is now magnetically coupled to the primary piston 16, and will remain so for as long as the solenoid remains energized. This force is enough to resist the downward drag arising from the dynamic passage of the gaseous fuel between the passageways 12 and 14, and the force exerted by the spring 66.

Once the solenoid is turned off, the force in the spring 66 is sufficient to initiate downward movement of the piston assembly, thus eventually closing the outlet passageway 14, and returning the assembly to the situation illustrated in FIG. 1, and described above.

It will thus be seen that the opening of the main access to the outlet passageway 14 is in no sense dependent upon the pressure in the passageway 14, as it is in the prior art. Indeed, the passageway 14 could even be vented to the atmosphere, without having any adverse effect on the operational details given above.

It has been found that a valve assembly constructed in accordance with this invention, as illustrated in the accompanying drawings, was able to go from complete closure to complete opening within an interval of 58 milliseconds.

While one embodiment of this invention has been illustrated in the accompanying drawings and described hereinabove, it will be evident to those skilled in the art that changes and modifications may be made therein without departing from the essence of this invention, as set forth in the appended claims.

The embodiments of the invention in which an exclusive property or privilege is claimed are defined as follows:

1. A valve construction for high pressure gases allowing rapid attainment of a fully open condition, comprising:

a main body defining a gas inlet passage and a gas outlet passage, a guide sleeve having at one end a closure preventing the escape of gas, a primary piston slidably mounted within said sleeve for movement toward and away from the closure, the primary piston having a loose fit within the sleeve, sufficient to allow gas from one end of the piston to reach the other end thereof, a biassing means urging the primary piston away from the closure, a secondary piston slidably mounted within said sleeve adjacent the primary piston at the end thereof remote from the closure, the secondary piston having a loose fit within the sleeve, thus allowing gas to enter the space between the secondary piston and the sleeve, seal means on said secondary piston adapted to close said gas outlet passage when the secondary piston is at a position remote from said closure, an axial passage within said secondary piston, the axial passage including a small-diameter bleed orifice, the axial passage communicating remote from the primary piston with the gas outlet passage, an elongate member received in said axial passage with sufficient tolerance to allow the passage of gas between the elongate member and the secondary piston, the elongate member including a first closure portion adapted to close and open said bleed orifice, the elongate member being affixed to said primary piston for axial movement therewith, the first closure portion passing through a bleed orifice chamber directly adjacent the bleed orifice, the bleed orifice chamber communicating with said axial passage, a second closure portion on said elongate member, adapted to open a portion of said axial passage remote from said bleed orifice when said bleed orifice is closed, and which can be closed by relative movement of the elongate member with respect to the axial passage, a peripheral seal between the secondary piston and the sleeve, acting to restrain the passage of gas axially between the secondary piston and the sleeve, a passage connecting the periphery of the secondary piston which is, with respect to the peripheral seal, remote from the primary piston, to the portion of the axial passage between said bleed orifice and said remote portion of said axial passage, a passageway in said secondary piston which connects a chamber between the first and second pistons with said bleed orifice chamber, and electrical coil means around the sleeve for generating a magnetic field adjacent the general location of the primary piston, such that the valve construction is in equilibrium when the coil is de-energized, said seal means closes the gas outlet passage, said first closure portion closes the bleed orifice, and said primary piston is furthest remote from said closure; said valve construction departing from equilibrium when the coil is energized, thus moving said primary piston toward the closure until said second closure portion closes, the first closure portion lifting off the bleed orifice and permitting gas to escape from around the primary piston through said passageway and out the bleed orifice, thus resulting in an increase in the pressure differential across said peripheral seal, which urges the secondary piston to move toward the primary piston, thus opening said seal means.

2. The construction claimed in claim 1, in which the guide sleeve is substantially cylindrical, and in which the biassing means is a compression coil spring.

3. The construction claimed in claim 1, in which said seal means on the secondary piston is constituted by a circular O-ring element, the gas outlet passage being surrounded by a frusto-conical valve seat, the secondary piston being configured to allow the O-ring element to achieve a gas-tight seal against said valve seat when the secondary piston is furthest from said closure of the guide sleeve.

4. The construction claimed in claim 1, in which said peripheral seal between the secondary piston and the sleeve is achieved by an O-ring element located in a circumferential recess in an outer cylindrical portion of the secondary piston.

5. The construction claimed in claim 1, in which said access passage extends substantially radially with respect to the secondary piston.

6. The constructions claimed in claim 1, in which said passageway in said secondary piston runs substantially parallel with the guide sleeve.

7. The construction claimed in claim 1, in which the magnetic filed generated by the coil when energized is shielded from the secondary piston, when the latter is in its position furthest removed from the closure of the guide sleeve, by the provision of a ferromagnetic annular collar which directs most of the magnetic flux into the primary piston, the field flowing into at least a portion of the secondary piston, however, when the latter has moved an initial increment toward the closure of the guide sleeve.

8. The construction claimed in claim 7, in which the guide sleeve is substantially cylindrical: in which the biassing means is a compression coil spring; in which said seal means on the secondary piston is constituted by a circular O-ring element, the gas outlet passage being surrounded by a frusto-conical valve seat, the secondary piston being configured to allow the O-ring element to achieve a gas-tight seal against said valve seat when the secondary piston is furthest from said closure of the guide sleeve; in which said peripheral seal between the secondary piston and the sleeve is achieved by an O-ring element located in a circumferential recess in an outer cylindrical portion of the secondary piston; in which said access passage extends substantially radially with respect to the secondary piston; and in which said passageway in said secondary piston runs substantially parallel with the guide sleeve.

9. A method of enabling the rapid, complete opening of a valve for high pressure gases, comprising the steps:

a) within a guide sleeve closed at one end, mounting for sliding movement therealong a ferromagnetic primary piston adjacent the closed end and a ferromagnetic secondary piston remote from the closed end, such that gas can pass between each piston and the guide sleeve, b) providing in the secondary piston an axial passage which includes a small-diameter bleed orifice and which communicates with a gas outlet passage, and providing seal means on the secondary piston adapted to close said gas outlet passage when the secondary piston is at a position remote from said closed end, c) providing an elongate member within said axial passage for movement therealong, the elongate member having a loose fit to enable gas to pass between the elongate member and the axial passage, the elongate member having a closure portion adapted to close and open the bleed orifice, the closure portion passing through a bleed orifice chamber which is directly adjacent the bleed orifice and which communicates with the axial passage.

d) providing a closure portion on said elongate member adapted to open and close said axial passage and which is open when the bleed orifice is closed, and which can be closed by relative movement between the elongate member and the axial passage, e) providing a seal between the secondary piston and the guide sleeve so as to permit longitudinal movement but to restrain the movement of gas therebetween, f) by means of a passage, connecting the periphery of the secondary piston at a location remote from the primary piston with respect to the seal defined under e), to a location on the axial passage which is remote from the primary piston with respect to the valve means defined under d)

g) linking a chamber between the two pistons with the bleed orifice chamber by way of a passageway;

h) biassing the primary piston away from the closed end, i) whereby equilibrium is attained and the seal means remains closed so long as no magnetic flux seeks to move the secondary piston toward the closed end of the sleeve, but opening of the seal means closing the gas outlet passage is attainable by:

j) moving the primary piston toward the closed end of the guide sleeve by establishing a magnetic field linking only portions of the primary piston, thus k) opening the bleed orifice and closing said valve means between the axial passage and the elongate member, thus l) increasing the differential pressure on the secondary piston, as seen across the seal defined under e), thus m) moving the secondary piston away from the gas outlet passage, and allowing direct communication between the gas outlet and the gas inlet passages.

10. The method claimed in claim 2, in which, under step e), the sealing of said space is accomplished by the use of an O-ring element.

11. The method claimed in claim 2, in which, under step h), the biassing of the primary piston is accomplished by using a compression coil spring.

12. The method claimed in claim 11, in which, under step e), the sealing of said space is accomplished by the use of an O-ring element.

* * * * *